United States Patent

Spalding

[15] 3,640,363

[45] Feb. 8, 1972

[54] FRICTION COUPLING

[72] Inventor: James R. Spalding, Wauwatosa, Wis.

[73] Assignee: General Electric Company

[22] Filed: Dec. 23, 1969

[21] Appl. No.: 887,476

[52] U.S. Cl. ................................192/65, 188/78 R, 192/76, 192/89 B, 242/107.3, 242/107.4, 287/53 R
[51] Int. Cl. ................F16d 11/06, F16d 13/14, F16d 51/00
[58] Field of Search ........................192/65, 74, 76, 75, 89 B; 188/78 R, 74; 242/107.3, 107.4, 129.2, 129.3; 287/53 R; 85/5 R

[56] References Cited

UNITED STATES PATENTS

| | | | |
|---|---|---|---|
| 261,887 | 8/1882 | Whitney | 192/65 |
| 596,558 | 1/1898 | Wagoner | 192/65 |
| 626,666 | 6/1899 | Chappel | 192/65 X |
| 869,820 | 10/1907 | Winans | 192/75 X |
| 2,503,854 | 4/1950 | Trainor | 85/5 R |
| 2,686,681 | 8/1954 | Nyland | 192/65 X |
| 2,707,108 | 4/1955 | Schottler | 192/65 UX |
| 3,321,221 | 5/1967 | Harris et al. | 287/53 R |

Primary Examiner—Allan D. Hermann
Attorney—Frank L. Neuhauser, Oscar B. Waddell, Joseph B. Forman, Jan Carl Gealow and Arthur V. Puccini

[57] ABSTRACT

The invention provides for coupling or uncoupling adjacent relatively moveable machine elements. One element has a circular or elongated recess defining frictionally engageable surfaces. The other element carries a curved spring member which fits into the recess loosely normally and is adapted for being flattened and expanded by moving one of the elements toward the other. The ends of the spring member thereby grip the frictionally engageable surfaces and couple the two elements together.

3 Claims, 7 Drawing Figures

PATENTED FEB 8 1972

3,640,363

Inventor
James P. Spalding
By
Ralph H. Hohenfeldt
Attorney

FRICTION COUPLING

BACKGROUND OF THE INVENTION

In connection with the manufacture of small appliances, cord reels and other electromechanical devices, there has been a need for a clutch or brake that can transmit a fairly large torque or translational force with a relatively small transfer or engaging force. Heretofore, clutches having friction linings have been commonly used for these purposes and clutching has been effected by various mechanisms such as rachets and pawls, solenoid actuators, lever mechanisms and the like. These prior art clutches are complicated and expensive compared with the total value of the appliances in which they are often used.

SUMMARY OF THE INVENTION

Objects of the present invention are to provide a friction coupling device that serves as a brake or clutch and is simple, inexpensive, is adaptable to many different devices, and requires a small operating force to effect the transfer of relatively large forces between machine elements.

In accordance with the invention, one machine element that is desired to be coupled and uncoupled from another is provided with a recess such as a counterbored hole. The periphery of the counterbore constitutes a frictionally engageable surface. A curved spring member such as a metal strip or a concave washer is fastened on one machine element which is adjacent to the other. The spring member fits loosely into the recess so that in its normally curved state, its ends are out of engagement with the frictionally engageable surface. When the machine element that carries the spring is moved toward the recess, the spring member tends to flatten and expand radially so that its ends grip the frictionally engageable surface directly to lock the two elements together. The coupling can be made so that upon release of the transfer force, the stored energy in the spring member will return it to its curved state for disengaging the coupling or it can be caused to lock-in so that an opposite transfer force is required to release it.

A more detailed description of some additional features of the invention as they are embodied in different versions of the device will now be given in reference to the drawing.

DESCRIPTION OF PREFERRED EMBODIMENTS

Figure 1:
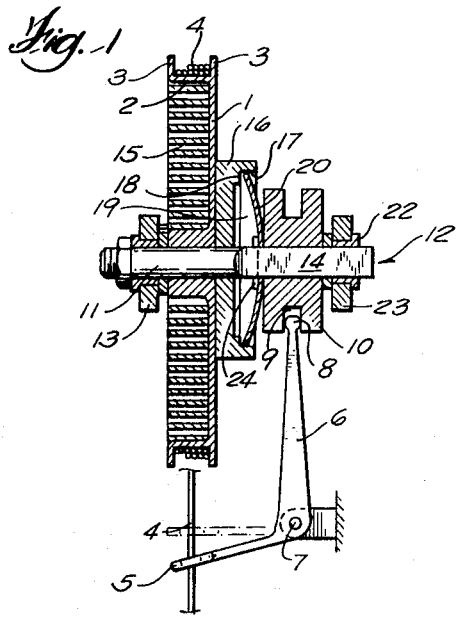
FIG. 1 is a cross section of a cord reel which embodies the new friction coupling in a case where it is used as a brake.
Figure 2:
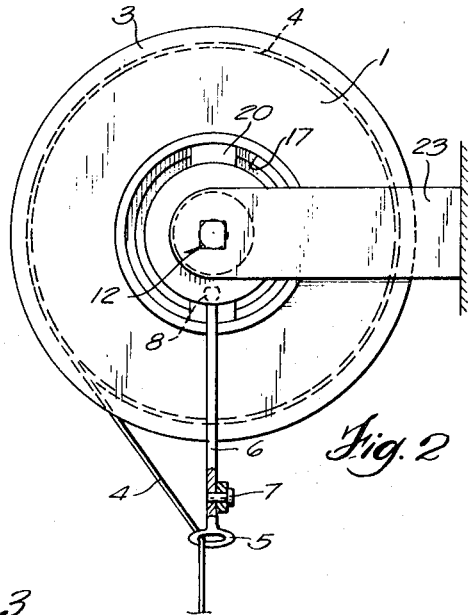
FIG. 2 is a right side elevational view of the cord reel shown in FIG. 1.

FIG. 1 shows the new friction coupling incorporated in a cord or cable reel for the purpose of latching a drum against the rotational force of a torsion spring. The drum is designated by the reference numeral 1 and it has the usual peripheral surface 2 with upstanding side flanges 3 between which a cord 4 is wound. The cord 4 is wound and unwound from drum 1 through an eye 5 which is formed on the end of a bellcrank 6. The bellcrank 6 is pivotally mounted at 7 and has an end 8 which extends into the slot 9 of a slidable clutch actuating element 10. When cord 4 is swung sidewise in one direction as shown in FIG. 1, the force transmitted at the margins of eye 5 causes bellcrank 6 to pivot and element 10 to slide in one direction. When cord 4 is swung in the opposite direction, slidable element 10 moves in the opposite direction.

Drum 1 is journaled for rotation on a round portion 11 of a shaft 12. The shaft 12 is supported against rotation in a stationary member 13. The right end of the shaft 12 in FIG. 1 has a square cross section in the region of numeral 14. Slidable actuator member 10 has a correspondingly shaped square central hole which permits it to slide on the portion 14 of the shaft 12 but prevents it from rotating. Thus, when the drum 1 and slidable actuator element 10 are coupled together, drum rotation is prevented.

Inside of drum 1 is a flat spiral spring 15 which has one end fastened to the drum periphery 2 and its other end fastened to any stationary element such as support 13. Thus, in a well-known fashion, when cord 4 is withdrawn from drum 1, spring 15 winds more tightly and when the cord is released, the stored energy of the spring rewinds the cord unless the drum is otherwise prevented from rotating.

Fastened to one face of drum 1 is a member 16 which is recessed on one side with a double counterbore. The internal peripheral surface 17 of the larger counterbore constitutes a frictionally engageable surface. Adjacent surface 17 is a radially extending stopping surface 18. Beyond stopping surface 18 there is a free space 19 in the recess.

Figure 3:
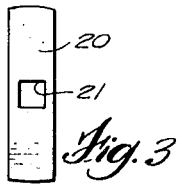
FIG. 3 is a curved spring member isolated from the device in FIG. 1.

Extending into the larger counterbore is a flat spring member 20 which has a curved cross section as shown. Spring member 20 also has a square central hole 21 which can be seen in FIG. 3 and which prevents the member from rotating on similarly shaped region 14 of shaft 12. Shaft 12 does not rotate because it is square where it passes through a bushing 22 in stationary support 23. Actuator element 10 has a square central hole and is adapted for sliding axially on square part 14 of shaft 12 but is prevented from rotating on it. Since actuator element 10 and curved spring member 20 each have square holes and are on a square shaft they are effectively coupled to each other and prevented from rotating. The spring member 20 is retained on shaft 12 against actuator element 10 with a snapring 24. When actuator element 10 is moved to the left in FIG. 1, the free ends of curved spring member 20 react against radial surface 18 and the spring member tends to flatten out and increase its radial size. This causes the ends of spring member 20 to frictionally engage peripheral surface 17 in the recess in which case drum 1 is effectively locked to nonrotating element 10.

The amount of force required for changing spring member 20 from its normally curved state to a state of lesser curvature is very small and is a function of the angle between the spring member and radial stopping surface 18. As this angle approaches zero, the frictional force between the ends of the spring member 20 and peripheral surface 17 approaches infinity.

Spring member 20 can be made of spring metal of such thickness and curvature that it tends to restore itself to its normally curved state when axial force is removed from actuator 10 in which case the drum 1 may be free for rotation under the influence of spiral spring 15. In a cord reel device, however, it is usually desirable to lock the drum 1 against rotation when the cord 4 is extended a certain distance and to require a releasing force when it is desired to have the spring-driven drum take up the cord. This more positive and durable locking action is obtained in the arrangement of FIG. 1 by compelling curved spring member 20 to toggle overcenter and assume a slight curvature in the opposite direction. This is one of the reasons for the free space 19 in the smaller counterbore being made available. When the spring member 20 curves oppositely, a positive force is required to bring it back to its straight position and finally to its normally curved state. Thus, when actuator element 10 is moved an adequate distance toward the left in FIG. 1, a self-sustained locking action occurs and is maintained until the actuator element 10 is forcibly moved to the right.

Figure 4:
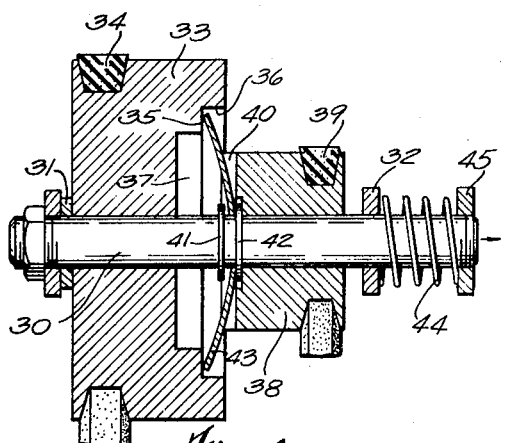
FIG. 4 is a cross-sectional view of a frictional coupling in which two rotatable machine elements are shown in their disengaged state.
Figure 5:
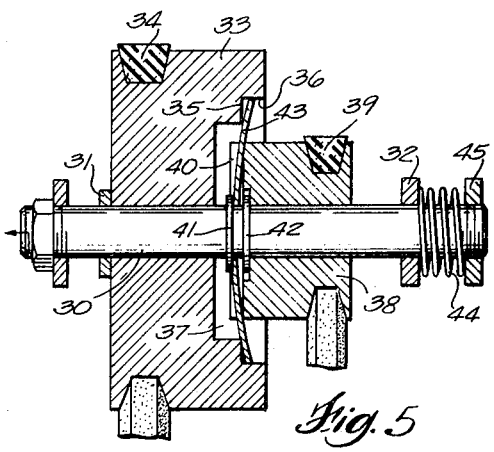
FIG. 5 is similar to the preceding figure except that the elements are coupled or engaged.

FIGS. 4 and 5 show the invention embodied in an arrangement for coupling and uncoupling rotatable machine elements. This is a clutch application. In this case there is a shaft 30 which is slidable in spaced-apart bearing members 31 and 32. FIG. 5 shows shaft 30 shifted axially to the left.

Journaled for rotation on shaft 30 is a pulley 33 on which there is a V-belt 34. One face of the pulley is recessed with a double counterbore for defining a radial stopping surface 35 and a peripheral frictionally engageable surface 36. Also defined in a circular recess 37.

Journaled on shaft 30 is another pulley 38 in which there is a V-belt 39. The face of pulley 38 which is presented to the recess in pulley 33 is provided with a diametral slot 40. There are snaprings 41, 42 on shaft 30 in the vicinity of slot 40 for the purpose of retaining a curved spring member 43 which serves a purpose described already in connection with FIG. 1. In this case, curved spring member 43 maintains a constant angular relationship with pulley 38 because the member is captured in slot 40.

In FIG. 4 one may see that shaft 30 and, hence, pulley 38 is biased toward the right by reason of an expanded coil spring 44 being disposed between bearing support 32 and a collar 45 on the end of the shaft. The force of coil spring 44 keeps curved spring member 43 in its most curved state and prevents its engagement with peripheral surface 36 on pulley 33. When shaft 30 is urged to the left, however, the force of coil spring 44 is overcome and curved spring member 43 reacts against stopping surface 35 and straightens or assumes a curvature in the opposite direction as shown in FIG. 5. When spring member 43 toggles overcenter as in FIG. 5 it remains in that state until it is forced to return to its original oppositely curved state and pulleys 38 and 33 are thereby locked together for joint rotation.

It should be evident from inspection of FIGS. 4 and 5 that coil spring 44 may be given various amounts of compressive or tensile force in which case the amount of force for transferring shaft 30 axially and for flattening the curved spring 43 may be made small or large as desired. The force of coil spring 44 may be such that it is great enough to effect locking between the curve spring member 43 and the frictionally engageable surface 36 with which it coacts, in which case, an external force must be applied to release the element from joint rotation.

Figure 6:
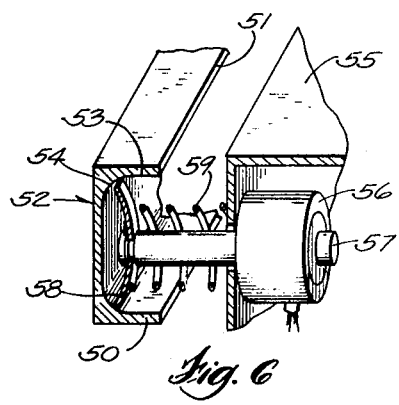
FIG. 6 shows the new coupling used on relatively translatable members, the coupling being disengaged; and, FIG. 7 is similar to the preceding figure except that the coupling is engaged.
Figure 7:
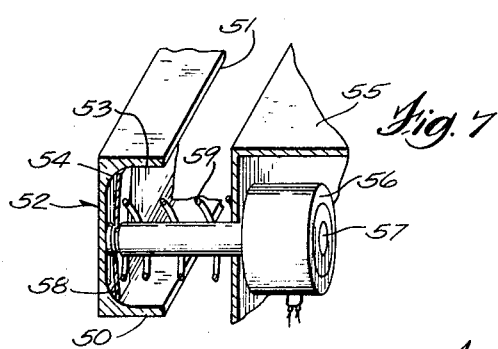

In FIGS. 6 and 7 the invention is adapted for use as a lock between two relatively translatable members. In this case, the frictionally engageable surface is defined by the interiors of legs 50, 51 of a channel member 52. The frictionally engageable surfaces are the insides of the channel legs and are marked 53. A fillet or curved corner region 54 constitutes a stopping surface against which the free ends of a curved spring 58 may react.

A machine element which is translatable in parallelism with the stationary channel member 52, is given the numeral 55. Mounted on element 55 is a solenoid operator 56 which has an armature 57 that carries at one end the curved spring member 58. Interposed between the elements 55 and curved spring member 58 is a coil spring 59. When the solenoid is energized as it is in FIG. 6, coil spring 59 is slightly compressed and curved spring 58 has its maximum normal curvature. In this condition, machine element 55 is free to translate in parallelism with channel 52 since there is no coupling force between them.

In FIG. 7 solenoid 56 is deenergized, allowing coil spring 59 to expand against curved spring member 58. The ends of the curved corners 54 of the channel and curved spring 58 flattens out or even curves in the opposite direction. The stationary channel 52 and the movable element 55 are thereby coupled together. The coupling may be released by energizing solenoid 56 and thereby returning curved spring 58 to its normally curved state as depicted in FIG. 6. Since power must be applied to this lock in order to release it, it is evident that loss of power will cause the coupling device to lock or fail-safe.

Although the curved spring members 20, 43 and 58 in FIGS. 1, 4 and 6 are all essentially flat strips of metal with curved edges to conform to the recess with which they coact, the spring members need not have this configuration nor are they limited to being mounted exclusively in the described manners. For instance, the spring members may comprise any resilient material formed in a concave disc such as a bellville washer, not shown. The washer may have suitable holes for registering with pins on one of the machine elements to preclude the washer from rotating as is achieved with a square shaft or a diametral slot in the described embodiments. In any case, the curved spring member may be normally locked or normally unlocked depending on the balance between the actuating force and the inherent force of the curved spring member.

The present invention is distinguished by the simplicity and effective locking action that results from having a curved spring member directly engage a frictionally engageable surface. There is no need to use brake lining or other known types of frictional interfaces that have been required in prior art friction couplings.

Although various embodiments of the invention have been described, such description is to be considered illustrative rather than limiting, for the invention may be variously embodied and is only to be limited by construing the claims which follow.

1. A friction coupling comprising:
 a. first and second relatively movable machine elements adjacent each other, the first element having frictionally engageable surfaces and a stopping surface defining a recess,
 b. a spring member having free ends and a curved cross section and being supported on said second element, the free ends of said spring member being out of engagement with the frictionally engageable surfaces, whereupon the two elements are uncoupled,
 c. and means adapted to move said elements relatively toward each other to thereby apply a force substantially normal to the curved spring member so that it reacts against the stopping surface and expands so that its free ends engage said frictionally engageable surfaces directly to effectively couple the two machine elements, said spring member being movable sufficiently to cause it to curve slightly in a direction opposite of its normal curvature whereby to effect self-sustained locking action with said frictionally engageable surfaces.

2. A friction coupling comprising:
 a. a shaft,
 b. first and second adjacent machine elements journaled for rotation on said shaft,
 c. the first element having a face that is presented toward the second element at least a pair of concentric counterbores of different diameters defining a radial stopping surface and a peripheral frictionally engageable surface,
 d. a curved spring member having free ends and being fastened on and rotatable with the second element and extending into the larger of the counterbores, and
 e. means adapted to reciprocate one of said machine elements axially on said shaft whereupon said curved spring member may be straightened by reacting against said stopping surface and radially enlarged to engage said peripheral surface, with said curved spring member being curved slightly in a direction opposite of its normal curvature to effect self-sustained engagement between said peripheral surface and said spring member, or may be restored to its curved state for disengagement from said peripheral surface.

3. A friction coupling comprising:
 a. a shaft,
 b. first and second adjacent machine elements journaled for rotation on said shaft,
 c. the first element having a face that is presented toward the second element at least a pair of concentric counterbores of different diameters defining a radial stopping surface and a peripheral frictionally engageable surface,
 d. a curved spring member having free ends and being fastened on and rotatable with the second element, said second element having a diametral groove facing said recess and said spring member is disposed in said groove, and said spring member extending into the larger of the counterbores, and e. means adapted to reciprocate one of said machine elements axially on said shaft whereupon said curved spring member may be straightened by reacting against said stopping surface and radially enlarged to engage said peripheral surface or may be restored to its curved state for disengagement from said peripheral surface.

* * * * *